United States Patent [19]
Adams et al.

[11] Patent Number: 5,504,744
[45] Date of Patent: Apr. 2, 1996

[54] BROADBAND SWITCHING NETWORK

[75] Inventors: John L. Adams, Felixstowe; Avril Smith, Carterton, both of England

[73] Assignee: British Telecommunications public limited company, London, England

[21] Appl. No.: 255,311

[22] Filed: Jun. 3, 1994

[30] Foreign Application Priority Data

Mar. 9, 1994 [EP] European Pat. Off. .............. 94301673

[51] Int. Cl.$^6$ .................................. H04L 12/56
[52] U.S. Cl. ........................ 370/60.1; 370/94.2
[58] Field of Search ................... 370/58.1, 58.2, 370/58.3, 60, 60.1, 94.1, 94.2, 95.1, 95.3, 79, 84

[56] References Cited

U.S. PATENT DOCUMENTS

| | | | |
|---|---|---|---|
| 5,271,005 | 12/1993 | Takase et al. ........................ | 370/60.1 |
| 5,289,462 | 2/1994 | Ahmadi et al. ...................... | 370/60.1 |
| 5,291,481 | 3/1994 | Doshi et al. ......................... | 370/60.1 |

OTHER PUBLICATIONS

Crocette et al, IEEE INFOCOM '91, vol. 3, Apr. 7, 1991, Bal Harbour, pp. 1145–1150 "Bandwidth Advertising for MAN/ATM Connectionless Internetting".

Saito et al, Transactions Of The Institute Of Electronics, Information And Communications Engineers, vol. E74, No. 4, Apr. 1991, Tokyo, pp. 761–771, "Traffic Control Technologies in ATM Networks".

Tranchier et al, International Switching Symposium, vol. 2, Oct. 1992, Yokohama, pp. 7–11, "Fast Bandwidth Allocation in ATM Networks".

*Primary Examiner*—Wellington Chin
*Attorney, Agent, or Firm*—Nixon & Vanderhye

[57] ABSTRACT

A broadband switching network is shown having a plurality of interconnected switching units arranged to transfer cells asynchronously therebetween. A switch control establishes connections for the asynchronous transmission of these cells between ports. A bandwidth control detects the rate at which cells are supplied to an input port; and, in response, requests switch control to allocate bandwidth to the connection. When bandwidth has not been allocated, received cells are downgraded or rejected by a usage control device. The usage control device only allows high priority cells to remain as such when bandwidth has been allocated. The network facilitates logical connections to be established without dial-up procedures. However, customers may be charged in terms of their actual usage made of the network.

21 Claims, 4 Drawing Sheets

BROADBAND SWITCHING NETWORK

BACKGROUND OF THE INVENTION

1. Field of the Invention

This invention relates to a broadband switching network for the switching of asynchronously transferred cells, and to a method of switching asynchronously transmitted cells of data.

2. Related Art

Broadband switching networks for switching asynchronously transferred cells are known, in which a predetermined level of bandwidth is allocated to a transmission channel, connecting a first customer to a second customer. In some of these known systems, a communications channel is provided over a significant period of time, effectively of the leased-line type, and manual measures are implemented in order to set up such a connection or to modify a connection, in terms of the particular terminations and the level of traffic being conveyed. Consequently, it is usual for customers to be charged a fixed rate for such a connection, resulting in payment being made irrespective as to whether that connection is being used or not.

Alternative systems have been proposed. In particular, it is possible for connections to be established on a dial-up basis, requiring termination equipment to be provided with facilities for establishing connections by issuing signalling commands and responding to similar commands issued by the network.

The use of permanent circuits to support a private communications network is widespread. The demand for such circuits is expected to grow to include broadband rates above 2 Mbit/s, where the traffic may be multiplexed from sources which are inherently bursty, together with the sources which are transmitted at constant bit rates that are delay sensitive, such as voice transmission and constant bit-rate video.

Asynchronous transfer mode (ATM) cells all have a fixed information field of forty eight octets which can carry customer traffic or customer originating control information (signalling). These two types of data transmission are distinguished by setting virtual path (VP) and virtual circuit (VC) values in the cell headers. Another field provided in the ATM header is known as cell loss priority, which enables low priority cells to be distinguished from high priority cells. In the event of congestion, the 10w priority cells will be discarded first.

For private circuits within an ATM based network, the desired route, the required bandwidth, and the quality of service (QOS) are set up using network management procedures. The private circuits are known as permanent virtual circuits because there is no actual physical circuit, only a VP/VC value or "label" which is associated with information stored in the switches to determine the route and preserve the bandwidth and QOS requirements.

A disadvantage of all known permanent circuits is that the bandwidth remains assigned to the circuit, even when the customer has nothing to transmit. This means that the customer may have to pay higher charges than could be obtained if the bandwidth was only made available when needed. The assumption being made here is that charging is related to reserved bandwidth, and this is not necessarily correct in terms of the way public network operators may choose to charge for virtual circuits. However, it is expected that charging based on reserved bandwidth will become a significant factor in the future. It has been proposed to see up a permanent virtual circuit so that it is only available during certain hours of the day, or during certain days of the week. A difficulty with this approach is that it does not allow the customer to change the pattern of usage quickly, and it may only crudely reflect the usage required by the customer.

A second proposal is to provide the customer with a separate communications channel to the network management plane, thereby allowing a permanent virtual circuit to be reconfigured. A difficulty with this approach is that some time delay will be incurred before the customer can start to use the virtual circuit.

A third proposal is to introduce equipment at every switching point in the network that recognises a fast resource management cell, indicating that bandwidth should now be assigned to the circuit. A difficulty with this approach is that there is no internationally agreed standard for a bandwidth-requesting cell that would be recognised by the switching equipment produced by the various manufacturers.

SUMMARY OF THE INVENTION

The present invention provides a broadband switching network for the switching of asynchronously transferred cells, the network comprising switch control means for establishing a connection for the asynchronous transmission of cells from an input port to an output port; and usage control means, arranged to downgrade the priority of transmitted cells if customer usage exceeds a first predetermined level; characterised by bandwidth control means arranged to detect the rate at which cells are supplied to the input port and to request the switch control means to allocate bandwidth to the connection in response to the detection, wherein the switch control means allocates bandwidth to input cells and increases the first predetermined level at which said usage control means downgrades the priority of transmitted cells.

In a preferred embodiment, the first predetermined level is see to zero when no actual use is being made of the network by the respective customer, resulting in initial cells being downgraded to low priority.

Preferably, the bandwidth control means adjusts the first predetermined level set by the usage control means by transmitting a message to the management control means, which in turn issues a message as to the usage control means.

The present invention also provides a method of asynchronously transmitting cells of data through a switchable network, the method comprising the steps of resetting a usage control means so as to downgrade the priority of input cells; detecting the presence of input cells requiring a level of bandwidth through the network; and requesting a switch control to allocate bandwidth in response to said detection; whereupon bandwidth is allocated by the switch control; and the usage control means is adjusted by the switch control so that high priority cells are maintained as such.

In a preferred embodiment, a request may be made to the switch control to provide as much bandwidth as is available, whereupon the switch control identifies the available bandwidth; bandwidth is allocated at a level for which a buffer is provided, and a feedback signal is generated if the level of data retained in said buffer exceeds a predetermined value.

BRIEF DESCRIPTION OF THE DRAWINGS

The invention will now be described in greater detail, by way of example, with reference to the accompanying drawings, in which.

DETAILED DESCRIPTION OF EXEMPLARY EMBODIMENTS

Figure 1:
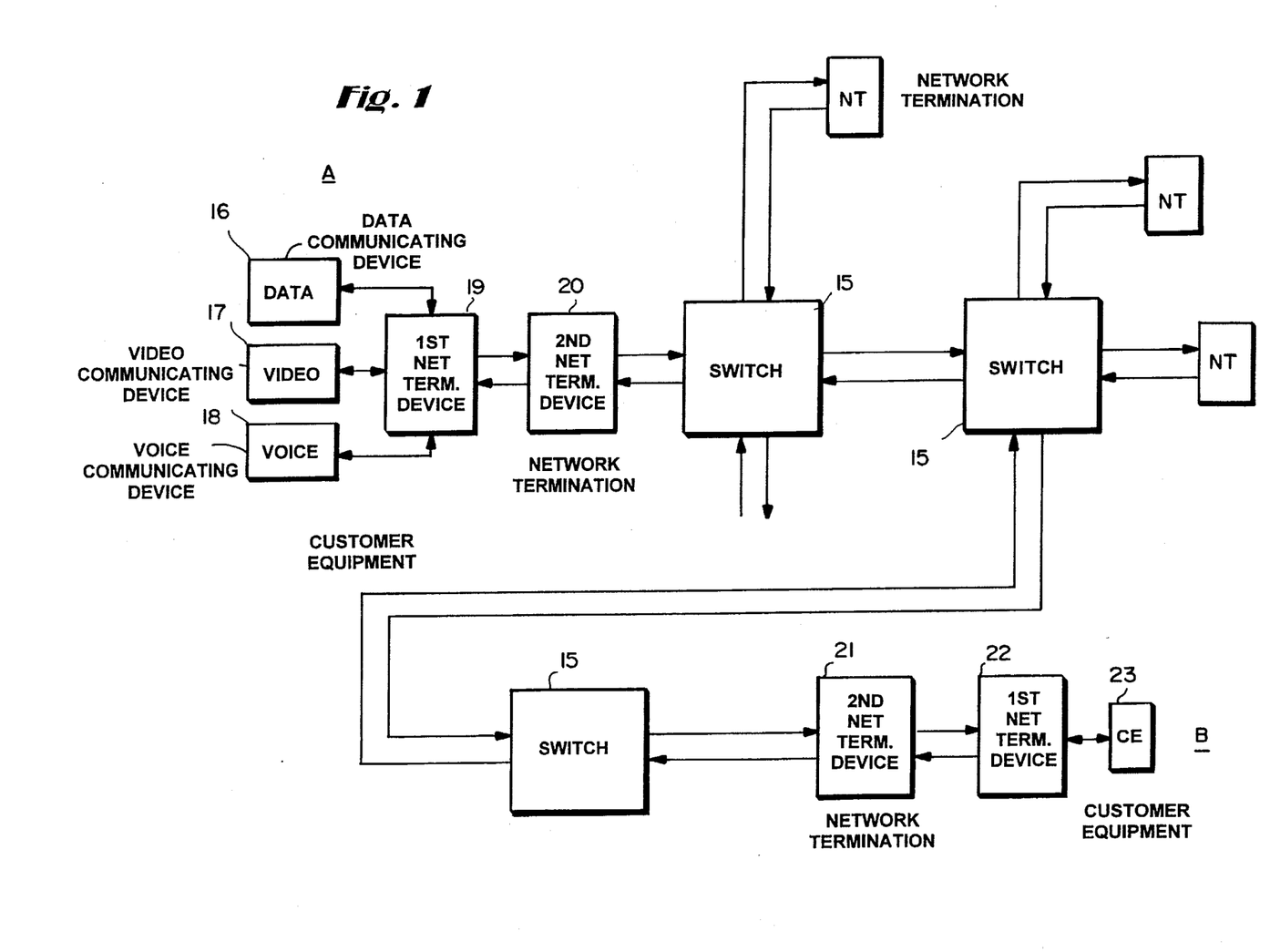
FIG. 1 shows a broadband switching network, configured with sub-switching networks connected to network termination devices.

A broadband environment for the transmission of asynchronous data is shown in FIG. 1. The environment includes a plurality of broadband switching networks (switches) 15, providing means by which transmission routes may be established between customers connected to the overall network.

Data is transmitted in the form of asynchronous transfer mode (ATM) cells, each having an information field of forty-eight octets, in addition to a header of five octets, which includes information facilitating transmission through the network itself. Thus, routing is controlled on a cell-by-cell basis and a plurality of transmission paths and time multiplexed slots may be employed for any particular link. ATM cells are, therefore, transmitted via virtual paths and virtual circuits, as defined by the header information.

The header of each ATM cell also includes a cell loss priority bit, thereby allowing each cell to be identified as having high priority or low priority. When congestion occurs, that is to say when elements within the overall switching network reach capacity, the network is arranged such that low priority cells are discarded in preference to high priority cells. Furthermore, in any operational network, the network itself would be designed such that, under normal operating circumstances, high priority cells would always be allowed through the network, so that congestion, resulting in the loss of low priority cells, would only occur during periods of peak demand. For some forms of data transmission, such as 64 kbit/s voice, cell loss may be acceptable. However, in other circumstances, it may be highly undesirable for cells to be lost, particularly when non-redundant data is being transmitted, under which circumstances a customer would expect traffic controls to ensure that all data cells were transmitted through the network with very low losses.

The network shown in FIG. 1 is particularly suitable for the transmission of "bursty" type signals in which the information content and hence data quantity, varies significantly over time, and may take place in concentrated intervals of relatively short duration, identified as bursts. Thus, the network is able to support for the transmission of bursty data; although, if required by a customer, it may also be configured to accommodate the transmission of speech, video or any other form of digitisable communication.

A complete transmission path is identified in FIG. 1 between a first customer A and a second customer B. However, it should be appreciated that the overall network would include a large number of switches 15, each providing access to the network for a plurality of customers.

Customer A has a data communicating device 16, a video communicating device 17, and a voice communicating device 18 connected to the network. Signals for these devices 16, 17 and 18 are routed to, or are received from, a first type of network terminating device 19, arranged to supply signals to, and receive signals from, a second type of network terminating device 20. The second type of network terminating device 20 provides isolation between data source/data sink equipment and the core network, and preferably includes electro-optical isolators, resulting in optical transmission between the terminating device 20 and the switch 15.

The network may operate in several ways, although two preferred modes of operation will be identified. One mode is to provide permanent connections between customers, of the leased-line type. In this mode of operation, a communications channel between customer A and customer B is established, and thereafter this channel remains open until the relationship is terminated. In a second mode of operation, the network operates in a switched-like way, in that signalling commands are issued by a customer. These signalling commands are, in turn, interpreted by the switch 15, resulting in the connection being established. However, in some data networking applications, it is envisaged that, once the connection has been established, it would remain in place for a significant period, possibly days. Therefore, such a link differs significantly from connections made via the public switch telephone network (PSTN), for example, where connection time is usually measured in minutes. Thus, in this second mode, the network provides a service similar to that provided by leased lines; and, in its first mode of operation which provides the basis for the preferred embodiment described herein, customer's equipment behaves as if a leased line were provided between communicating sites. Under this preferred mode of operation, it is unnecessary for customer's equipment to include any mechanisms for generating signalling, allowing customer A immediately to initiate communication with customer B.

Thus, it can be appreciated that, given cells are switched on a cell-by-cell basis and each cell is individually routed in response to its own header information, the ability to direct a specific number of cells to a particular destination is equivalent to allocating a level of bandwidth to that particular channel.

Thus, signals generated by customer A will be supplied to the switching environment from the network termination device 20, and will be directed to customer B, via a network terminating device 21 and a network terminating device 22. At the location of customer B, customer equipment 23 is provided for the transmission and reception of traffic. Therefore, transmission between customer A and customer S is only in the form of data, with other communication channels being be required for customer A to effect communication of voice and video signals via the network.

Figure 2:
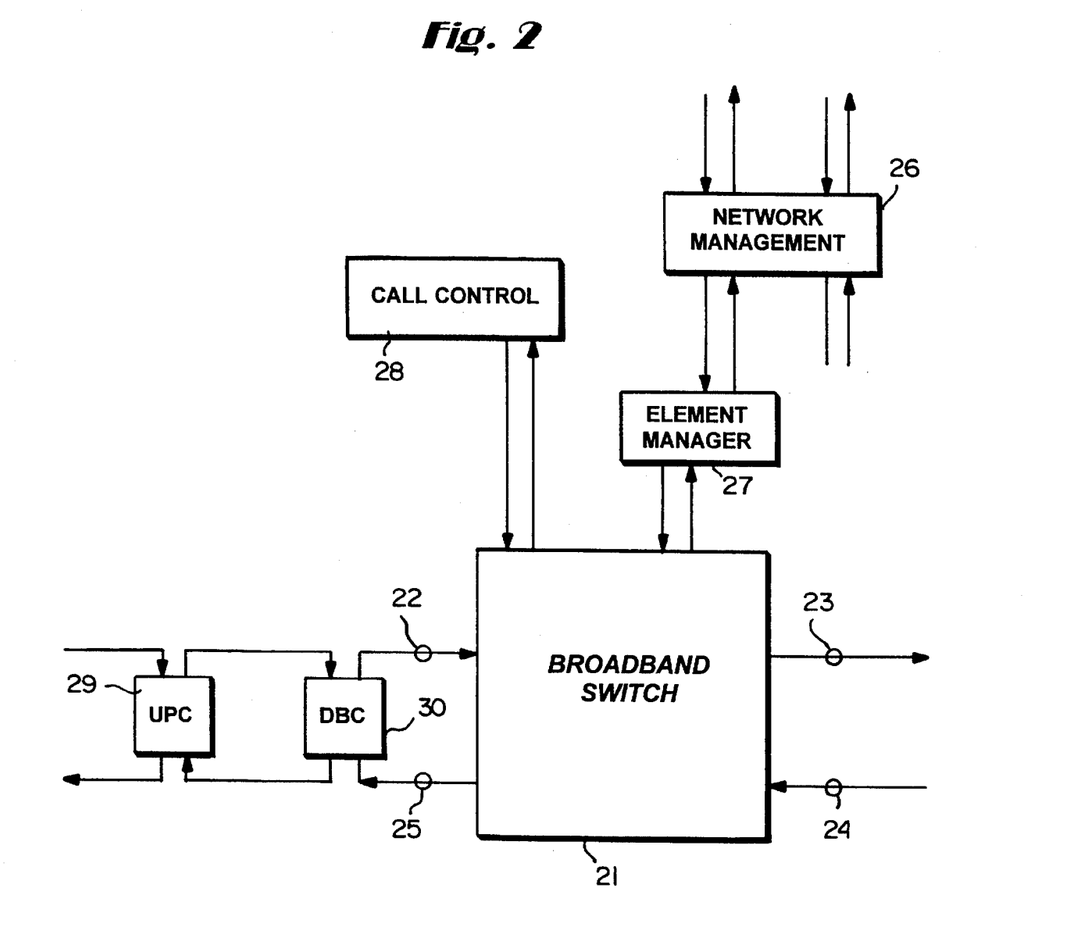
FIG. 2 shows a sub-switching network of the type identified in FIG. 1, including a broadband asynchronous switch, a usage parameter control device and a dynamic bandwidth controller.

The switching network 15 illustrated in FIG. 1 is shown in more detail in FIG. 2. At the heart of the switching network 15, a broadband switch 21 is provided, the broadband switch having a plurality of input ports and a plurality of output ports. Thus, output signals from customer A are supplied to an input port 22 of the broadband switch 21, and the switch is arranged to supply cells received at that port to an output port 23, which in turn directs said cells, via similar switching devices, to customer B. Similarly, output cells from customer B are ultimately supplied to the broadband switch 21 at an input port 24, allowing the switch 21 to direct said cells to an output port 25.

The establishment of logical paths within the broadband switch 21 is effected by a network management computer 26, which is also responsible for overseeing the operation of a plurality or similar broadband switches.

Communication between the network management computer 26 and the broadband switch 21 is made via a respective element manager 27, which is switch-specific and provides an interface between the switch and the network management computer. Thus, proprietary broadband switches from a plurality of manufacturers may be configured within an overall network, interfaced via respective element managers 27.

Traffic control of the broadband switch 21 is effected via a call controller 28. Thus, it is necessary for the call controller 28 to receive information defining the bandwidth requirement for any particular logical connection, thereby ensuring that suitable operation of the broadband switch 21 is made under the control of the call controller, so as to minimise cell loss. As previously stated, the arrangement should be configured such that cells identified as being of a high priority are never lost, and low priority cells are only lost when the broadband switch 21 is overloaded when congested.

The network includes usage parameter control devices 29, which conform to the operations defined within Recommendation I 371. Thus, a usage parameter control device 29 is provided for each customer, and is programmed in accordance with the required level of service required by the customer. Thus, a customer's usage contract will specify a first traffic threshold, below which, all cells identified as being of high priority will remain at this priority, thereby ensuring their successful transmission through the network. However, once traffic exceeds the first threshold, some cells will have their priority downgraded to low priority, such that it cannot be guaranteed that transmission will successfully take place through the network. Thus, a user will have a guaranteed bandwidth, beyond which traffic may be accepted, but transmission through the network cannot be guaranteed.

Clearly, an operator must be given some indication of maximum demand, otherwise it would be impossible to design suitable switching devices. The usage parameter control device, therefore, defines a second traffic threshold, beyond which cells will be removed from the data stream altogether, thereby ensuring that the bandwidth requirement made of the switch never exceeds, for that particular customer, the traffic level defined by the second threshold.

Thus, in normal operation, a customer would aim to stay below the first threshold, thereby ensuring that all cells are transmitted through the network. However, if (possibly through some unexpected occurrence) traffic demand increases, the network may have capacity to accommodate this increase in traffic, thereby maintaining data integrity for the customer, while at the same time being provided with a mechanism for removing offending cells, thereby ensuring that cells to which bandwidth has been guaranteed are transmitted through the network.

Thus, within each broadband switch 21 and under the control of the call controller 28, low priority cells may be rejected when congestion occurs. However, as previously stated, the overall network would be configured such that high priority cells would be guaranteed transmission through the network.

In the present preferred embodiment, a customer may remain permanently physically connected to the network, and may be under the impression that the network is permanently configured so as to make bandwidth available, even when the customer does not have a requirement to make use of this available bandwidth. However, the customer is only charged when an actual use of the network is made, preferably by charging the customer on the basis of the number of cells transmitted over the logical link. Thus, prior to transmission being invoked by, say customer A, the broadband switch 21 may be actually allocating no bandwidth whatsoever for transmission between the input port 22 and the output port 23. Furthermore, it is not necessary for any special activity to be made by customer A in order for bandwidth to be allocated. A level of bandwidth will be assigned to customer A when required.

After transmitted cells have passed the usage parameter control device 29, they are directed to a dynamic bandwidth controller 30. It may take a short interval for the call controller 28 to find the required level of bandwidth required by the bandwidth controller 30 so that, during the interval required by call control to process the bandwidth request, all transmitted cells are downgraded to low priority.

In addition to customer A generating signals, which, as previously stated, are supplied to the input port 22, signals are also transmitted back to customer A via the output port 25. These output signals are also supplied to the dynamic bandwidth controller 30, allowing said controller to transmit signals back to customer A. Thus, in particular, the dynamic bandwidth controller 30 may issue a signal back to customer A, instructing customer A to reduce its data output to avoid the risk of cells being lost.

Figure 3:
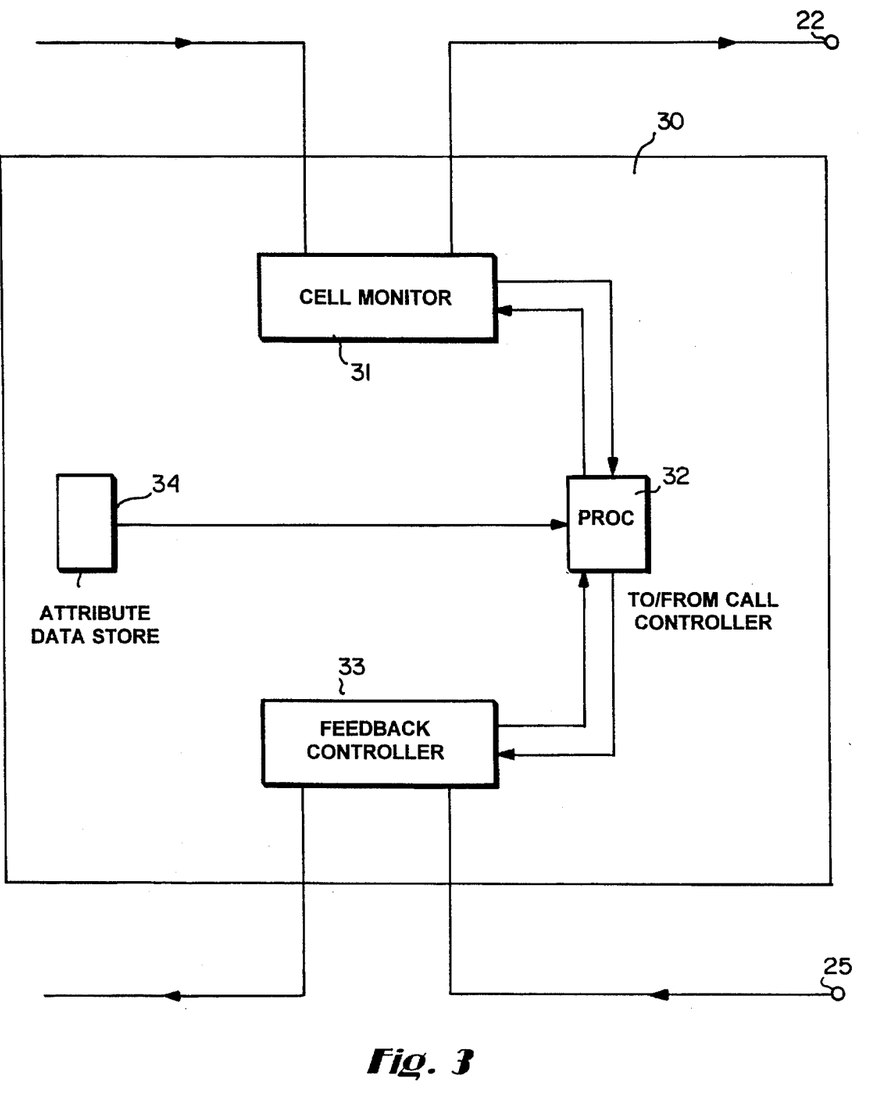
FIG. 3 shows the dynamic bandwidth controller identified in FIG. 2, and includes a cell monitor; and, FIG. 4 shows the cell monitor shown in FIG. 3.

The dynamic bandwidth controller 30 is shown in more detail in FIG. 3, and includes a cell monitor 31, a processor 32, a feed back controller 33 and an attribute data store 34.

Data is transmitted to the port 22 and similar data is received from the port 25 in the form of discrete cells, having forty-eight octets of user information plus a five octet header.

The five octet header includes a virtual path identifier (VPI) and a virtual channel identifier (VCI) which effectively define the connection such that cells forming part of a common message will be transmitted over the same connection. In addition, the last 8-bit octet of the header is a header error check field which, as its name suggests, provides a degree of redundancy, by which error checking may be performed on the header information. Thus, the principal reason for providing the header error check field is to ensure that the header information is correct, thereby ensuring that cells are not transmitted to erroneous addresses.

Within the cell monitor 31, the header error check field is used to identify the start of a cell. Thus, the cell monitor 31 is provided with logic for implementing the algorithm associated with the header error check field in order to identify the position of said field. Thus, the logic provided within the cell monitor 31 is not concerned with the identification of errors given that, on start-up, it is not aware of the position of the header error check field. It, therefore, assumes that a particular octet is the error check field and performs the error checking algorithm on what, given the assumed position of this field, would be the remainder of the field upon which an error checking operation is to be performed. If the algorithm results in a to determination to the effect that an error is present, it is assumed that the device has selected the wrong position for the header error checking field and a modification is made. Thus, modifications of field position will continue to be made until the algorithm produces a result to the effect that no error is present. Under these conditions, the correct header error check field will have been selected, and will continue to be selected on a cell-by-cell basis. By making use of the header error check field in this way, it is possible for the cell monitor 31 to identify the start of an asynchronously transmitted cell.

In addition to customer originating data being transmitted in the form of cells, it is also possible for the processor 32 to communicate with customer equipment and sub-switching networks within the overall switching environment by generating control information cells. These cells would be given unique VPI and VCI values to route them within the broadband switch 21 to, for example, the controller 26. Similarly, the processor 32 may generate cells which are supplied to customer equipment, via the feed back controller 33.

As previously stated, the usage parameter controller 29, shown in FIG. 2, is capable of modifying the priority of transmitted cells. It will be appreciated that information defining priority thresholds would be held by the network manager 26, and so the usage parameter controller 29 may be adjusted in response to signals received in the form of cells, from the network manager 26.

In previous systems, signals would only be supplied to the usage parameter controller 29 when a customer's contract as modified, reflecting a change in the customer's requirement for bandwidth. However, in the present embodiment, the allocation of bandwidth to customers is dynamically controlled so that, in its non-active state, a transmission path having zero bandwidth capacity is effectively allocated for a customer. Thus, in order to reflect this state, an instruction is issued by the network manager 26 to the usage parameter controller 29 setting the first threshold level to zero. Under these conditions, all cells received by the usage parameter controller will be modified to cells of low priority, so that it cannot be guaranteed that the cells will be transmitted through the network. However, during these non-active periods, it is assumed that no demand is being made of the network and that switching capacity may be allocated to other users.

In the preferred embodiment, it is not necessary for a customer to perform any signalling functions in order to initiate a call. The data itself is identified by the dynamic bandwidth controller 29, and triggers the generation of bandwidth requests to the network management or call control. At the initiation of a transmission, all cells are changed to low priority and this state remains true until bandwidth has been assigned to the connection.

Referring to FIG. 3, low priority cells, during the initiation of transmission, are supplied to the cell monitor 31 which writes these cells to a first-in-first-out (FIFO) shift register for re-transmission, with minimal delay, to the port 22. The shift register includes taps which supply values to combinational logic which, as previously described, is capable of identifying cell phase, with reference to the header error check field.

On identifying The presence of cells within its shift register, the cell monitor 31 generates a transmission active signal, which is supplied to the processor 32 along with an indication of the VCI and the VPI associated with the cells being transmitted. In response to this information, the processor 32 will interrogate the attribute data store 34 so as to identify the bandwidth allocation associated with said identifiers. In response to this enquiry, data is supplied back to the processor 32, identifying the bandwidth provision for the particular communication identified by the call monitor 31.

The processor 32 is arranged to configure control cells for transmission to other elements in the network, and in response to the "transmission active" signal generated by the cell monitor 31 and the data read from the attribute data store 34, a message is assembled for transmission to the network manager 26, requesting the establishment of bandwidth within the broadband switch 21, facilitating communication between the input port 22 and the output port 23. In response to this request, the network manager 26 will determine whether this amount of bandwidth is available and, if so, bandwidth is assigned has been the connection.

In addition, the network manager 26 also transmits a message to the port 25, for the usage parameter controller 29 which, in response to this message, adjusts its threshold values such that cells are no-longer marked as low priority provided that the raze is less than, or equal to, the bandwidth now granted to the connection.

In some situations, a customer may wish to transmit important data where a guarantee is required that the data will be received at its destination. If the terminal transmits a sequence of trial cells all marked as high priority then, under the scenario described above, it can be appreciated that initial cells will have their priority level downgraded by the usage parameter controller 29 until a state has been reached such that bandwidth allocation is guaranteed through the broadband switch 21. Thus, at the receiver, a succession of low priority trial cells may be received prior to the reception of high priority cells, which are only transmitted after bandwidth has been granted.

Thus, where a customer requires a guaranteed communication to be established, it is possible for a receiver to examine the status of received cells, and then to issue a signal back to the originating customer when cells of high priority are being received. The receipt of high priority cells will indicate that high priority cells will be maintained and, under this condition, the originating customer may then transmit the high priority data, secure in the knowledge that the high priority cells will remain as such throughout the transmission through the network; it only being the initial start up period where down grading occurs. Thus, the network automatically responds to a request for bandwidth provision without undergoing an initiation or signalling routine. The trade-off for this functionality is that the priority level of initial cells will be downgraded, and the duration over which this downgrading occurs will depend upon the capacity of the network to establish the bandwidth requirement and thereby issue modifying signals to the relevant usage parameter control devices; thereafter, bandwidth provision is guaranteed.

The cell monitor 31 is also capable of detecting the absence of cells passing therethrough. As previously described, provision is made for the identification of cell transmission, and the cell monitor 31 includes a time-out circuit which will ensure that a periodic investigation is made as to whether cells are continuing to be transmitted. When transmission ceases, the cell monitor 31 will effectively time-out and supply a signal to the processor 32 to the effect that transmission has ceased. In response to this signal, the processor 32 will configure a message and transmit this cell to the network manager 26 via the cell monitor 31. In response to this message, the network manager 26 will allow re-allocation of the bandwidth within the broadband switch 21, and issue a message to the usage parameter controller 29, again re-setting the threshold level to zero, such that, on the next iteration, initial cells will have their priority level reset to low priority.

It will be appreciated that many logical connections may be achieved via common physical links. Thus, at a particular input to the overall network, an input port, such as the port 22, may receive cells relating to a plurality of Logical connections; and, similarly, the dynamic bandwidth controller 30 will control bandwidth allocation for each of these logical connections.

The allocation of bandwidth has been described for the broadband switch 21 shown in FIG. 2, which is the first broadband switch encountered on entry to the overall network of the type shown in FIG. 1. The bandwidth request made by the dynamic bandwidth controller 30 will also result in interrogations being made of each switch through which the connection passes in order to establish the availability of bandwidth. Thus, provision may have to be made at a plurality of broadband switches, before a message is returned to the dynamic bandwidth controller 30, confirming that bandwidth has been allocated, thereby ensuring that high priority cells are transmitted through the overall network.

As previously stated, the header information is identified by the processor 32 and, in response to this information, attribute data is read from the attribute data store 34, identifying the bandwidth allocated to that particular channel. Thus, for example, the attribute data store 34 may identify the channel as a 1 Mbit/s channel, a 5 Mbit/s channel or a 10 Mbit/s channel etc, depending upon the level of service contracted to the customer.

A further feature provided by the dynamic bandwidth controller 30 is that of allowing a customer access to whatever bandwidth is available at the particular time when a request is made. Thus, when cells arrive from a customer to whom this provision has been made available, an indication is supplied to the processor 32, from the attribute data store 34, to the effect that the cells are to be given whatever bandwidth is available for providing a channel between the two communicating stations.

The processor 32 will construct a message and transmit this cell, identifying the customers request, to the network manager 26. In response to this request, the network manager 26 is required to determine the level of available bandwidth from the communicating source to the communication destination. The available bandwidth over the logical channel will be restricted by whichever physical link has the minimum available bandwidth. Thus, if a communications channel is constructed over three serial physical links, a first of which has 10 Mbit/s available, a second of which also has ten megabits available while a third only has 2 Mbit/s available, the bandwidth available over the combination is only 2 Mbit/s and the remaining 8 Mbit/s at the first and second stages of the link cannot be employed because a bottleneck exists at the station which only has 2 Mbit/s available. Thus, in response to the request made by the processor 32, the network manager 26 will determine the total bandwidth available, and return this information back to the dynamic bandwidth controller 30.

A complication arises when provision is made for allocating whatever bandwidth is available in response to a customer request. At the time the request is made, the requesting customer is not aware of what actual level of bandwidth will be available. Furthermore, the network is not aware of the extent to which the requesting customer will require bandwidth. Thus, the network will provide whatever bandwidth is available; and, under some circumstances, this may be insufficient for the customer's requirements. Under these conditions, it is necessary for the network to issue instructions back to the customer, in the form of suitably constructed cells, so as to inform the customer that congestion is imminent, and that action must be taken to reduce the level of traffic supplied to the network.

Cells of this type, instructing a transmitting customer's terminal to reduce its output traffic, are generated by the processor 32 and supplied to the originating terminal via the feedback controller 33. In order to determine whether such a feedback instruction requires to be generated, the cell monitor 31 includes buffers arranged to buffer incoming data of this type, and to generate overflow signals when it is detected that data is being written to the buffers at a faster rate than it is being read from said buffers.

Figure 4:
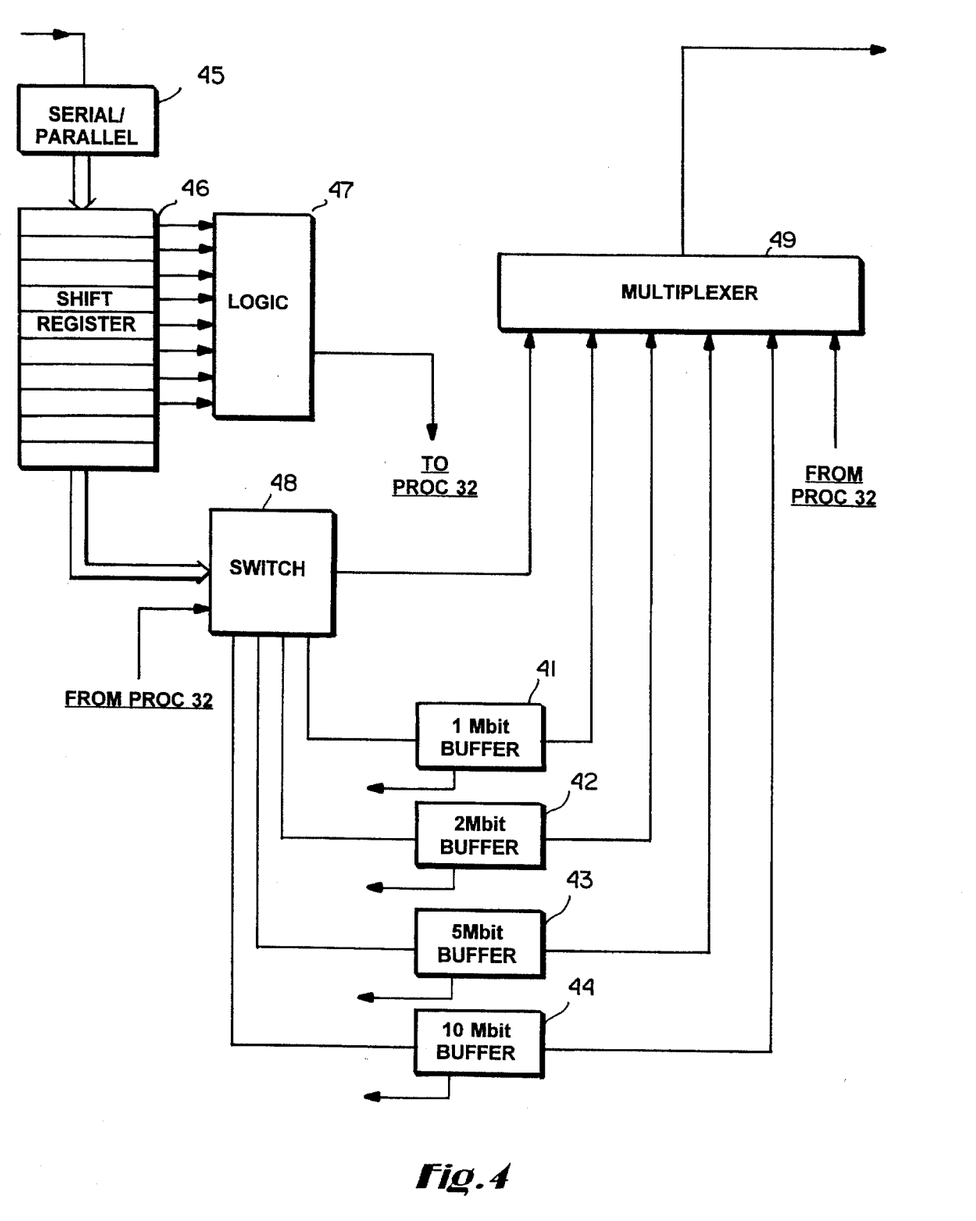

The cell monitor 31 of FIG. 3 is shown in more detail in FIG. 4. It should be appreciated that, by its very nature of being capable of transmitting cells in accordance with the available bandwidth, cells of this type will be transmitted at different rates, depending on the bandwidth available when the particular request is made, and that separate buffering devices must be provided for each particular rate.

In theory, the level of available bandwidth would be continuously variable and, in response to such a request, any number (within the definition of the system) could be returned to the requesting processor. Under such circumstances, in order to make full advantage of the available bandwidth, it would be necessary to provide buffering devices for every possible transmission rate, or to provide variable rate buffers for each logical channel being transmitted through the system. Each of these alternatives is undesirable.

As shown in FIG. 4, four physical buffers 41, 42, 43 and 44 are provided. The first buffer 41 is arranged to buffer cells being transmitted at 1 Mbit/s, the second buffer 42 is arranged to buffer cells being transmitted at 2 Mbit/s, the third buffer 43 is arranged to buffer cells transmitted at 5 Mbit/s, and the fourth buffer 41 is arranged to buffer cells transmitted at 10 Mbit/s. In practice, the actual number of buffers provided will depend upon operating requirements, as will the actual data rates for which they accommodate cells.

Cells are transmitted from customer equipment and supplied to the port 22 as a serial stream. However, in the cell monitor 31, the serial stream is converted into parallel bit octets by a serial-to-parallel converter 45, which in turn supplies these octets to a parallel shift register 46. The shift register 46 is tapped, allowing a plurality of octets to be read simultaneously by a logic circuit 47 which, as previously described, is arranged to identify the presence of data transmission, the position of headers within cells, and to supply header information to the processor 32. The processor 32 will, in turn, identify the stored bandwidth allocation for the particular cell being transmitted and; in response to this determination, will supply control signals to a switch 48.

If a cell is identified as belonging to a logical communications channel for which the required bandwidth has been specified, the switch 48 is arranged, in response to signals received from the processor 32, to supply cells directly to a multiplexer 49. However, if the cells detected are of the type which will result in a request for "whatever bandwidth is available" to be made available for their transmission, cells supplied to the switch 48 will be directed to one of the buffers 41 to 44, rather than being supplied directly to the multiplexer 49.

After a request has been made by the processor 32 to provide "whatever bandwidth is available", the network manager 26 will supply information back, in the form of an appropriately addressed message, to the processor 32 identifying the level of bandwidth which is available. When a level of available bandwidth is received by the processor 32, it will not immediately make this bandwidth available for transmission. In preference to making whatever bandwidth is available actually available for transmission purposes, the processor 32 reduces the level of bandwidth available to a level equivalent to the nearest lower value for which a buffer has been provided. Thus, referring to the buffer values provided in FIG. 4, if the available bandwidth comes back as being greater than 10 Mbit/s, the actual bandwidth made available is 10 Mbit/s, and the buffer 44 is used. Similarly, if the available bandwidth is greater than 5 Mbit/s, but less than 10 Mbit/s, 5 Mbit/s is made available and the buffer 43 is used. Similarly, if the actual available bandwidth is between 2 Mbit/s and 5 Mbit/s, the actual allocated bandwidth provision is set to 2 Mbit/s and the buffer 42 is used. Similarly, if the actual bandwidth available is between 1 Mbit/s and 2 Mbit/s, the actual bandwidth allocated is set at 1 Mbit/s, allowing the buffer 41 to be used. Finally, if the actual available bandwidth is less than 1 Mbit/s, it is assumed that no bandwidth is actually available and no provision will be made for facilitating high priority data transmission.

Thus, as described above, the processor 32 will convert the actual level of bandwidth available to one of the processable transmission rates and supply a suitable signal to the switch 48 accordingly. For example, if it is determined that the actual available bandwidth is 3 Mbit/s, a signal identifying this level of provision is supplied to the processor 32 from the network manager 26. In response to this signal, the processor 32 selects one of the processable transmission rates which, in this example, will be 2 Mbit/s, thereby allowing transmission to occur at high priority up to a limit of 2 Mbit/s. A signal is supplied to the switch 48 from the processor 32, thereby directing cells from this link to the buffer 42. The cells are clocked through the 2 Mbit/s buffer 42 in a first-in-first-out fashion, ultimately resulting in said cells being supplied to the multiplexer 49. It should be appreciated that the buffer 42 will also receive 2 Mbit/s cells from other logical links, all of which will be clocked out of that buffer at the appropriate rate. At the multiplexer 49, these cells are combined with cells received from the other buffers and cells received directly from the switch 48 for transmission, during appropriate time slots, to the input port 22. As shown in FIG. 4, the multiplexer 49 is also arranged to receive cells directly from the processor 32 which, as previously described, are required for housekeeping purposes within the switching environment.

SUMMARY OF APPLICATION WITHIN EXISTING NETWORKS

A terminal is connected, via a physical link, to a local exchange, which includes interconnection functions, control functions for call processing, management functions for managing resources and usage parameter control functions for policing traffic entering the public network. All of these functions are common to existing ATM based machines. However, it is proposed that the local exchange includes an additional function which is termed the dynamic bandwidth controller (DBC), which can interact with the management and/or call control functions.

The DBC functions may be summarised as follows:

I. To monitor specific private virtual circuits (PVCs) within the link which connect the terminal to other terminals via interconnection functions and to detect whether traffic activity commences on any PVC.

II. To set the CLP bits to low priority on a cell transmitted on a monitor PVC while no bandwidth has been assigned to that PVC. Alternatively, to conform to standards which dictate that the CLP bit shall only be changed by the usage parameter control (UPC), so as to transmit a control message to network management/ call control once inactivity has been detected on a PVC, requesting that the UPC parameter is updated, thereby ensuring that all subsequent cells are passed (up to an agreed maximum rate) but are marked as low priority, "violation tagged".

II. When traffic activity is detected on a PVC, to generate signalling messages to the call control function and/or management functions, and to request that the connection attributes are changed, that is, bandwidth is assigned to the PVC which is either a fixed value agreed with the customer for that PVC, or is the highest available bit rate.

IV. To receive signalling messages from the call control function and/or the management function, acknowledging the "change attribute" request and indicating that bandwidth has been granted for this PVC, if any.

V. To stop overwriting of the CLP with low priority indication whenever bandwidth has been granted. Alternatively, to conform with standards which state that the CLP bit shall only be modified by the UPC to generate a control message to network management/ call control whenever bandwidth has been granted for a PVC, requesting that the UPC parameters are updated, so that cells are passed up to given maximum rate with no modification, ie violation tagging, of the CLP.

VI. To provide feedback control to the terminal, as necessary, to keep the traffic associated with this PVC at a rate which is not greater than can be supported by the granted bandwidth.

VII. To detect when traffic activity ceases for a period of more than n milliseconds and, if this occurs, to generate a signalling message informing the call control function and/or the management function that the connection attributes should be changed, such that zero bandwidth is assigned.

The cell monitor function decides, for each PVC, whether traffic activity has commenced or ceased. Cells transmitted by a terminal, or other PVC end station, are passed to the DBC via an interface. The cell monitor function may include serial-to-parallel conversion of the arriving digital signals, and a shift register to store all or part of the cell header, to facilitate processing of the VPI/VCI and the CLP bit. The cell monitor function includes the capability that it can set the CLP bit to low priority on any cell. However, this can be turned off by the processor function. Prior to passing the cell onwards towards the network, via an interface, the cell monitor function can perform parallel-to-serial conversion of the digital signals, as required.

The cell monitor function informs the processor function whenever traffic activity has changed on a PVC. The processor function generates appropriate control signals to activate/deactivate the CLP over-writing function within the cell monitor. The CLP over-writing function is activated on a particular PVC whenever call control or network management informs the processor that no bandwidth is assigned on that PVC. Alternatively, the processor function generates a control signal which is transmitted to request the call control or network management to update the UPC parameters, so that all cells are violation tagged on this PVC. The CLP over-writing function is deactivated on a particular PVC, whenever call control or network management informs the processor that guaranteed bandwidth has been assigned to the PVC. If required, the processor function will also generate a request to call control or network management to the effect that UPC parameters have been changed to stop violation tagging.

The processor function also generates control signals to call control and network management, which request bandwidth changes to the PVC. Bandwidth request and acknowledge signals are sent and received via an interface. The correct generation of these signals by the processor relies on data stored in the PVC attributes data store, which contains information on the amount of guaranteed bandwidth required or whether any available bit rate can be assigned up to a given maximum value and above a given minimum value.

Cells which travel in the opposite direction towards the terminal are passed to a DBC feedback function via an interface. The purpose of this function is to instruct terminals to stop or transmit at any speed which does not infringe the peak rate or sustained cell rate specified in traffic contract monitored by the UPC. The feedback function may pass these signals back to the terminal either by modifying the generic flow control (GFC) field of any cell header or by inserting a control cell in place of an unassigned cell, when this arrives.

The feedback function may include serial-to-parallel conversion of the arriving digital signals, and a shift register is provided to allow the processing of cell headers and parallel-to-serial conversion of output digital signals.

The processor function informs the feedback function of the correct rate at which to apply feedback signals to the terminals. No feedback signals are required to be generated when the customer has requested that a fixed bandwidth is to be assigned, rather than any available bit rate. In this case, it is assumed that the terminal always transmits at the fixed rate, which is monitored by the UPC. Therefore, no further control function is required to keep the terminal transmitting at the correct rate.

However, for customers who have requested that any available bit rate should be assigned to the PVC, between given minimum and maximum values, it is assumed that the UPC only checks that the maximum has not been exceeded.

Cells from available bit rate PVCs, when arriving at the DBC, are routed internally to one of several buffers within the cell monitor function. The cells from fixed bit rate PVCs need not be routed to any buffer, since no additional bit rate checks are necessary, other than as provided by the UPC, in which case there are two distinct delay characteristics. Firstly, fixed bit rate PVCs carrying bursty traffic with low delay, suitable for variable bit rate video and, secondly, available bit rate PVCs carrying bursty traffic with a large buffer delay, suitable for data which is not delay-sensitive.

The buffers within the cell monitor function are each associated with a traffic class, based upon an output bit rate. All available bit rate PVCs are assigned to one of these classes, based on the bandwidth granted by the call control and network management.

When requesting any available bit rate for a PVC, the DBC may either supply the acceptable class rates as parameters of the request, or start with a request for the highest class rate acceptable for the PVC, as stored in the PVC attribute data store and, if call control or network management does not grant that request, a second request is generated for the lowest class rate acceptable for the PVC. If this request is granted, no further requests are made, and the PVC is assigned to that class. Until an available bit rate PVC is assigned to a class, no cells are diverted to any buffer, and all cells are marked with low priority. Furthermore, cells arriving at the DBC which are not diverted to a buffer, either from fixed bit rate PVCs or from available bit rate PVCs, which have not yet been granted any bandwidth, have priority over cells in a transmit buffer. A transmit buffer is a common buffer to which cells are transferred from class buffers, prior to output.

This rule of transmission priority is necessary, to ensure cell sequence integrity of available bit rate PVCs and to ensure that fixed bit rate PVCs, have minimum delay. To understand the cell sequence integrity guarantee for available bit rate PVCs, it is clear that, if the first R cells are transmitted prior to bandwidth being guaranteed, and if cell R+1 and all remaining cells (until inactivity is detected) are diverted to a class buffer then, because of the priority transmission rule above, cell R+1 cannot be transmitted before the Rth cells.

If NPVCs are in the 2 Mbit/s class, cells are transmitted to the transmit buffer at a rate of n times 2 Mbit/s. This ensures that available bit rate PVCs conform to the rate expected by the network. If the terminal is transmitting faster than this rate, the effect will be that the class buffer begins to fill, but there will be additional unexpected traffic entering the network beyond the DBC.

The cell monitor function provides an indication to the processor function whenever a class buffer has been filled above a pre-assigned threshold, or when it has been filled below another pre-determined threshold. When the processor function receives an indication that a class buffer is filled above said first threshold, it instructs the feedback function to deliver "stop transmitting" signals to the appropriate terminals. The PVCs identities of the appropriate terminals are passed to the feedback function from the processor function, and the feedback function may then insert a series of control cells with the same PVC values which instruct all those terminals to stop. Alternatively, it may stop all PVCs using GFC, if there is a large number of PVCs to stop, for example, if there is only a small number of different classes.

When the processor function receives an indication that a class buffer is filled below the second threshold, it instructs the feedback function that the cell transmission can start again on those PVCs. In this case, the feedback function will no longer transmit control cells to those PVCs or said function will change the GFC setting if it was controlling a large number of PVCs.

We claim:

1. A broadband switching network for the switching of asynchronously transferred cells, the network comprising:

switch control means for establishing a connection for the asynchronous transmission of cells from an input port to an output port;

usage control means, arranged to downgrade the priority of transmitted cells if customer usage exceeds a first predetermined level; and bandwidth control means arranged to detect the rate at which cells are supplied to the input port and to request the switch control means to allocate bandwidth to the connection in response to said detection, wherein the switch control means allocates bandwidth to input cells and increases said first predetermined level.

2. A network according to claim 1, wherein the first predetermined usage level for a particular customer is set to zero when no actual use is being made of the network by that customer.

3. A network according to claim 1 wherein said usage control means defines a second predetermined bandwidth level, above which transmitted cells are rejected.

4. A network according to claim 3, wherein said second predetermined level is set to a value greater than zero for a particular customer when no use is being made of the network by that customer.

5. A network according to claim 1 wherein the bandwidth control means adjusts the first predetermined level set by the usage control means by transmitting a message to management control means, which in turn issues a message to the usage control means.

6. A network according to claim 1, wherein the bandwidth control means includes a plurality of buffers connected to accept input cells and to later output such temporarily stored cells for transmission over the network, said buffers being arranged to buffer cells transmitted within a bandwidth determined by the switch control means.

7. A network according to claim 6, wherein a sequence of said buffers corresponds to a corresponding sequence of predetermined bandwidths, each successive buffer being used fox cell transmission at a corresponding bandwidth, said determined bandwidth being determined as the next lowest bandwidth corresponding to a respective buffer.

8. A network according to claim 6, wherein if at least one of said plurality of buffers can buffer cells transmitted at a higher rate than the determined bandwidth, the bandwidth control means issues a message to reduce the input of cells.

9. A network according to claim 1, wherein the bandwidth control means includes means for performing error checking to identify the start of one of said transmitted cells.

10. A network according to claim 1, wherein a logical connection is established between customers located at respectively corresponding pairs of said input and output ports in response to signalling demands issued by one of said customers into its respective input port.

11. A method of asynchronously transmitting cells of data through a switchable network wherein the cells are assigned different relative priorities for transmission through the network, the method comprising steps of:

re-setting a usage control means associated with a cell input port so as to downgrade the priority of input cells via said input port;

detecting the presence of input cells at said port requiting a level of bandwidth through the network; and requesting a switch control in the network to allocate network bandwidth in response to said detection;

whereupon bandwidth is allocated by said switch control and the usage control means is adjusted by the switch control to upgrade the priority of input cells via said input port so that high priority cells are maintained as such.

12. A method according to claim 11 performed using a plurality of buffers connected to accept input cells and to later output such temporarily stored cells for transmission over the network, wherein:

said requesting step includes making a request to the switch control to provide as much bandwidth as is available;

whereupon the switch control identifies the available bandwidth and bandwidth is allocated at a level for which an available one of said buffers is provided; and a feedback signal is generated if the level of data retained in said available buffer exceeds a predetermined value.

13. A broadband switching network having:

an input port for connection to a signal source and an output port for connection to a signal receiving system;

a switch for transmitting information-carrying asynchronously transferred data cells from the input port to the output port, the data cells each including a cell loss priority bit allowing each cell to be identified as being a high priority cell or a low priority cell;

switch control means for establishing a connection between the input port and the output port via the switch;

usage control means which sets a first traffic threshold below which high priority cells supplied to the input port remain high priority cells, and above which some high priority cells supplied to the input port are downgraded to low priority cells; and bandwidth control means arranged to detect the rate at which cells are received at the input port and, automatically in response to such cell detection, to cause the switch control means to allocate bandwidth for the transmission of the cells to the output port, and to cause the usage control means to increase the first traffic threshold.

14. A network according to claim 13, wherein the switch control means sets the first traffic threshold to zero when no cells are supplied to the input port by the signal source, resulting in high priority cells subsequently supplied to the input port initially being downgraded to low priority cells.

15. A network according to claim 13, wherein the usage control means defines a second predetermined traffic threshold, above which transmitted cells are rejected.

16. A network according to claim 15, wherein the second predetermined traffic threshold is set to a value greater than zero when no cells are being supplied to the input port by the signal source.

17. A network according to claim 13, wherein the bandwidth control means adjusts the first traffic threshold set by the usage control means by transmitting a control message to management control means, which in turn issues a control message to the usage control means.

18. A network according to claim 13, wherein the bandwidth control means includes a plurality of buffers, each of which is arranged to buffer cells transmitted at a respective rate determined by the switch control means.

19. A network according to claim 18, wherein each of the buffers buffers cells transmitted at a rate higher than said respective rate, and wherein the bandwidth control means subsequently issues a message to reduce the transmission rate of cells supplied to the input port by the signal source.

20. A method of operating a broadband switching network for transmitting information-carrying asynchronously transferred data cells from an input of the network to an output of the network, the data cells each including a cell loss priority bit allowing each cell to be identified as being a high priority cell or a low priority cell, the method comprising the steps of:

setting a first traffic threshold in usage control means, the first traffic threshold defining a level below which high priority cells supplied to the input remain high priority cells, and above which some high priority cells supplied to the input are downgraded to low priority cells;

detecting the presence of cells at the input and automatically causing, in response to such cell detection, a switch control to allocate sufficient bandwidth for the transmission of the cells through the network; and adjusting the usage control means to increase the first traffic threshold so that high priority cells supplied to the input are maintained as such.

21. A method according to claim 20, further comprising the steps of:

the switch control identifying the bandwidth available for transmission through the network, allocating to cells supplied to the input bandwidth at a level for which a buffer is provided, and generating a feedback signal if the level of data retained in said buffer exceeds a predetermined value, whereby the switch control provides as much bandwidth as is available for the transmission.

* * * * *

UNITED STATES PATENT AND TRADEMARK OFFICE
CERTIFICATE OF CORRECTION

PATENT NO. : 5,504,744
DATED : April 2, 1996
INVENTOR(S) : John Leonard ADAMS and Avril SMITH

It is certified that error appears in the above-identified patent and that said letters patent is hereby corrected as shown below:

On the title page: Item

[73] Assignee: should read

--British Telecommunications public limited company, London, England and Oxford Brookes University, Oxfordshire, England Signed and Sealed this Twelfth Day of November, 1996

Attest:

BRUCE LEHMAN

*Attesting Officer*     *Commissioner of Patents and Trademarks*